United States Patent [19]
Naito et al.

[11] Patent Number: 5,644,203
[45] Date of Patent: Jul. 1, 1997

[54] BRUSHLESS MOTOR SPEED DETECTOR

[75] Inventors: Hayato Naito; Isao Uchikoshi, both of Komagane, Japan

[73] Assignee: Sanyo Seiki Mfg. Co., Ltd., Nagano-ken, Japan

[21] Appl. No.: 432,144

[22] PCT Filed: Nov. 9, 1993

[86] PCT No.: PCT/JP93/01618

§ 371 Date: Jun. 26, 1995

§ 102(e) Date: Jun. 26, 1995

[30] Foreign Application Priority Data

Nov. 10, 1992 [JP] Japan .................................. 4-324766
Jul. 26, 1993 [JP] Japan .................................. 5-203665

[51] Int. Cl.⁶ .................................................. A01R 39/46
[52] U.S. Cl. .......................... 318/439; 318/138; 318/254; 388/800
[58] Field of Search ..................... 318/439, 138, 318/254, 798–815; 388/800

[56] References Cited

U.S. PATENT DOCUMENTS

| | | | |
|---|---|---|---|
| 5,426,354 | 6/1995 | Bausch ........................... | 318/254 |
| 5,433,541 | 7/1995 | Hieda et al. .................... | 388/800 X |
| 5,467,173 | 11/1995 | Sakata et al. ................. | 318/798 |
| 5,477,121 | 12/1995 | Sirjola ........................... | 318/799 |

FOREIGN PATENT DOCUMENTS

| | | |
|---|---|---|
| 55-147709 | 11/1980 | Japan . |
| 60-87691 | 5/1985 | Japan . |
| 62-71484 | 4/1987 | Japan . |
| 2-97294 | 4/1990 | Japan . |
| 2-159992 | 6/1990 | Japan . |
| 3-277191 | 12/1991 | Japan . |
| 4-54499 | 5/1992 | Japan . |
| 4-193084 | 7/1992 | Japan . |

*Primary Examiner*—Karen Masih
*Attorney, Agent, or Firm*—McAulay Fisher Nissen Goldberg & Kiel, LLP

[57] ABSTRACT

A brushless motor speed detector requires no FG pattern or FG magnetization so that a motor structure is not restricted. The detector includes a simple detection circuit and a simple detection signal processing circuit, and is capable of obtaining a high-accuracy detection signal by using a variable signal output circuit for providing a signal alternately varied due to the rotation of a motor, a constant signal output circuit for providing a signal not varied due to the rotation of the motor, and a comparator for comparing an output signal of the variable signal output means with output signals of the constant signal output means or for comparing output signals of the first and second variable signal output circuit with each other to provide speed detection signals for one turn of the motor more than the number of driving magnetized poles.

7 Claims, 7 Drawing Sheets

SPEED DETECTION SIGNAL

BRUSHLESS MOTOR SPEED DETECTOR

BACKGROUND OF THE INVENTION a) Field of the Invention

The present invention relates to a brushless motor speed detector requiring no frequency generator (hereinafter referred to as FG) pattern or FG magnetization.

b) Description of the Related Art

An FG is widely used as a speed detector for various motors. FIGS. 10 to 13 show examples of the FG. In FIG. 10, a stator core 2 radially having a proper number of salient poles is secured onto a motor substrate 1 and a driving coil 3 is wound on each salient pole of the stator core 2. Moreover, an FG pattern 4 is formed on the substrate 1 like a rectangular wave along a circle concentric with and outside of the stator core 2. Furthermore, a motor driving IC 5 is arranged on the substrate 1.

A rotor 6 shown in FIGS. 11 and 12 is arranged on the stator core 2 and the FG pattern 4 so as to cover them. The rotor 6 comprises a compressed-cup-shaped rotor case 7 and an annular driving magnet 8 secured to the inside annular wall of the case 7. The rotor 6 is rotatably supported by the substrate 1 through a proper bearing at a proper interval between the external surface of each salient pole of the stator core 2 and the internal surface of the driving magnet 8. In FIG. 11, the bottom of the driving magnet 8 is magnetized at certain intervals in the circumferential direction to form an FG magnetizing section 9. The FG magnetizing section 9 faces the FG pattern at a certain interval.

In FIGS. 10 and 13, an output terminal 4a of the FG pattern 4 is connected to an input terminal of an FG amplifier 5a in the motor driver IC 5. Power is generated by each power generating section when the rotor 6 rotates and the magnetic flux emitted from the FG magnetizing section 9 crosses each power generating section of the FG pattern 4 and a signal with a frequency proportional to a motor speed is provided as an output from the output terminal 4a of the FG pattern 4. The output signal is waveform-shaped and amplified by the FG amplifier to serve as a speed detection signal. The speed detection signal is supplied as an output to a motor speed control circuit.

Therefore, the FG has widely been used as a general motor speed detector. To constitute the FG, an FG pattern and FG magnetization are necessary, thereby motor structure is restricted and cost also increases. A motor speed detector requiring no FG pattern or FG magnetization has been proposed. Some motor speed detectors are disclosed in the official gazettes of Japanese Patent Laid-Open No. 97294/1990, Japanese Utility Model Laid-Open No. 54499/1992, Japanese Patent Laid-Open No. 277191/1991, and Japanese Patent Laid-Open No. 193084/1992 in which the midpoint voltage of a driving coil and the counterelectromotive voltage of each phase driving coil are compared by a comparator to detect the alternate change point of the counterelectromotive voltage and provide a signal as an output corresponding to the detected point as a speed detection signal.

FIG. 14 shows an example of basic structures of the speed detectors.

In the case of the brushless motor, three-phase sine-wave signals corresponding to the relative positional relation between a stator having driving coils $L_U$, $L_V$, and $L_W$ and a not-illustrated rotor having magnetic poles are provided as as outputs from a not-illustrated Hall element to a brushless motor driving circuit 10 and the rotor rotates when a driving current is provided as an output from the brushless motor driving circuit 10 to the driving coils $L_U$, $L_V$, and $L_W$.

The brushless motor is provided with a speed detector comprising a comparator group 16 and a logic circuit 17. That is, comparators 16a, 16b, and 16c for comparing the output voltage of each phase with the coil midpoint voltage are connected to the output terminals of the driving coils $L_U$, $L_V$, and $L_W$ respectively; AND gates 17a, 17b, and 17c using two of outputs from the comparators 16a, 16b, and 16c as their inputs are connected to the output terminals of the comparators 16a, 16b, and 16c respectively; and an OR gate 17d is connected to the output terminals of the AND gates 17a, 17b, and 17c.

Therefore, the output voltage of each phase and the coil midpoint voltage are compared by the comparators 16a, 16b, and 16c and the rectangular-wave signals shown by "a", "b", and "c" in FIG. 15 are provided as outputs from the comparators. The logical product of these signals is computed by the AND gates 17a, 17b, and 17c and the signals shown by "d", "e", and "f" in FIG. 15 are provided as outputs from the AND gates 17a, 17b, and 17c. Moreover, the logical sum of these signals is computed by the OR gate 17d and the speed detection signal shown by "g" in FIG. 15 is provided as an output from the OR gate 17d.

Then, motor speed can be kept constant by supplying the speed detection as an input signal "g" thus detected to a motor speed control circuit (not illustrated) so as to operate a control input of the brushless motor driving circuit 10.

Therefore, because the above speed detectors can detect speed without using a frequency generator (FG), it is possible to decrease the number of parts and decrease the cost.

The alphabet representing each waveform in FIG. 15 corresponds to that representing each point shown in FIG. 14.

The speed detectors disclosed in the above official gazettes have the disadvantages that it is necessary to use detection circuits including a comparator by the number of motor phases, and thereby a detection-signal processing circuit is complex and the accuracy of a detection signal is deteriorated due to the fluctuation of detection circuits of various phases.

That is, in the case of the examples shown in FIGS. 14 and 15, because three comparators 16a, 16b, and 16c are used, problems occur that the accuracy of a detection signal is deteriorated due to the characteristic difference between the comparators and the reliability is lowered. Moreover, because the comparator group 16 and the logic circuit 17 are used, a problem occurs in that the circuit is complex.

Even by using a detection circuit including a comparator only for one phase, it is possible to obtain a detection signal proportional to speed. In this case, however, the number of detection signals for one turn of a motor decreases greatly and the resolution lowers greatly.

OBJECT AND SUMMARY OF THE INVENTION

The present invention is made to solve the above problems and its primary object is to provide a brushless motor speed detector requiring no FG pattern or FG magnetization so that the motor structure is not restricted. The speed detector has a simple detection circuit and detection signal processing circuit and is capable of obtaining a high-accuracy detection signal.

To achieve the above object, the first aspect of the invention comprises variable signal output means for generating and providing a signal which is alternately varied due to the rotation of a motor in accordance with the output voltage waveform from the driving coil of each phase of the motor, constant signal output means for generating and providing a signal as an output which is not varied due to the rotation of the motor in accordance with the output voltage waveform from the driving coil of each phase of the motor, control means for controlling the invariable signal from said constant signal means so as to coincide with the coil midpoint reference voltage of a driving coil and a comparator for comparing an output signal of the variable signal output means with that of the constant signal provide means to output speed detection signals as outputs for one turn of the motor more than the number of driving magnetized poles.

A second aspect of the invention comprises variable signal output means which uses a coil midpoint detector constituted by connecting one group of ends of resistances equal to the number of phases to the output terminals of a driver and connecting the other ends of them to each other or uses a coil midpoint and constant signal output means which uses an intermediate voltage detector for detecting the intermediate voltage between the maximum and minimum values of each phase-coil output voltage waveform or the reference voltage of a midpoint feedback amplifier; wherein a coil midpoint feedback circuit using an output of the intermediate voltage detector is formed.

A third aspect of the invention comprises variable signal output means which uses an intermediate voltage detector for detecting the intermediate voltage between the maximum and minimum values of each phase-coil output voltage waveform and constant signal output means which uses a coil midpoint detector constituted by connecting one group of ends of resistances equal to the number of phases to the output terminals of a driver and connecting the other group of ends of them to each other, a coil midpoint, or the reference voltage of a midpoint feedback amplifier; wherein a coil midpoint feedback circuit using an output of the coil midpoint detector is formed.

A fourth aspect of the invention provides that a speed detection signal sent from one comparator is supplied as an input to a speed control circuit in order to control speed in the first, second, and third inventions.

A fifth aspect of the invention comprises first and second variable signal output means for providing as an output a signal which is alternately varied due to the rotation of a motor and a comparator for comparing an output signal of the first variable signal output means with an output signal of the second variable signal output means to output speed detection signals for one turn of the motor more than the number of driving magnetized poles.

A sixth aspect of the invention is a brushless motor speed detector comprising first and second variable signal output means for providing a signal as an output which is alternately varied due to the rotation of a motor and a comparator for comparing an output signal of the first variable signal output means with that of the second variable signal output means to output speed detection signals for one turn of the motor more than the number of driving magnetized poles; wherein the first variable signal output means includes a two-input diode OR circuit connected between the phases of the output terminals of a driving coil respectively and a three-input circuit connected to each output terminal of the two-input diode OF circuit and inversely connected to the diode of the two-input OR circuit, and the second variable output means includes a coil mid-point voltage detection means for detecting the voltage of the midpoint of the three-phase driving coil.

In the case of the first aspect of the invention, a speed detection signal corresponding no the alternate cycle of a variable signal is always stably obtained by comparing an alternate variable signal generated in accordance with the driving-coil output voltage waveform of each phase of a motor and is provided as an output from the variable signal output means due to the rotation of the motor with a signal controlled so that a constant signal provided as an output from the constant signal output means coincides with the coil midpoint reference voltage of a driving coil by one comparator.

In the case of the second and third aspects of the inventions, when the coil midpoint feedback circuit is formed by using an output of one of the coil midpoint detector constituted by connecting one group of ends of resistances equal to the number of phases to the output terminals of a driver or the coil midpoint constituted by connecting the other group of ends of them to each other and the intermediate voltage detector for detecting the intermediate voltage between the maximum and minimum values of each phase-coil output voltage waveform, one of the coil midpoint detector or the coil midpoint and the intermediate voltage detector serves as constant signal output means and the other of them serves as variable signal output means. Moreover, it is possible to obtain speed detection signals for one turn of a motor more than the number of driving magnetized poles by comparing an output of the coil midpoint detector, the reference voltage of the midpoint feedback amplifier, or an output of the coil midpoint with an output of the intermediate voltage detector by one comparator.

In this case, the output signal from one comparator can be used for speed control as described in the fourth invention.

Moreover, according to the fifth aspect of the invention, a speed detection signal corresponding to the alternate cycle of a variable signal can be obtained by comparing alternate variable signals provided as outputs from the first and second variable signal output means to each other.

Furthermore, in the case of the sixth aspect of the invention, an input waveform with the highest potential among three input waveforms is provided as an output from the three-input diode OR circuit inversely connected to the two-input diode OR circuit by providing as output an input waveform with lower potential of two input waveforms from the two-input diode OR circuit of the first variable signal output means and an input waveform with the lowest potential among three input waveforms is outputted from the three-input diode OR circuit by providing as an output an input waveform with higher potential of two input waveforms from the two-input diode OR circuit. In any case, a triangular-wave signal is provided as an output from the three-input diode OR circuit. Then, the triangular-wave signal outputted from the first variable signal output means is compared with the coil midpoint voltage detected by the coil midpoint voltage detection means serving as the second variable signal output means by a comparator and a speed detection signal is provided from the comparator as an output.

Therefore, according to the present invention, a speed detection signal can be obtained without using an FG pattern or FG magnetization. Moreover, because use of only one comparator is enough, the structure is simple and low-cost and there is no fluctuation of circuits. Therefore, a high-accuracy speed detection signal can be obtained. Moreover, because one comparator provided speed detection signals which are greater in number than the number of driving magnetized poles, a high-resolution speed detection signal for a brushless motor can be obtained.

For a better understanding of the present invention, reference is made to the following description and accompanying drawings while the scope of the invention will be pointed out in the appended claims.

DESCRIPTION OF THE PREFERRED EMBODIMENTS

Embodiments of the brushless motor speed detector of the present invention are described below by referring to the accompanying drawings.

Figure 1:
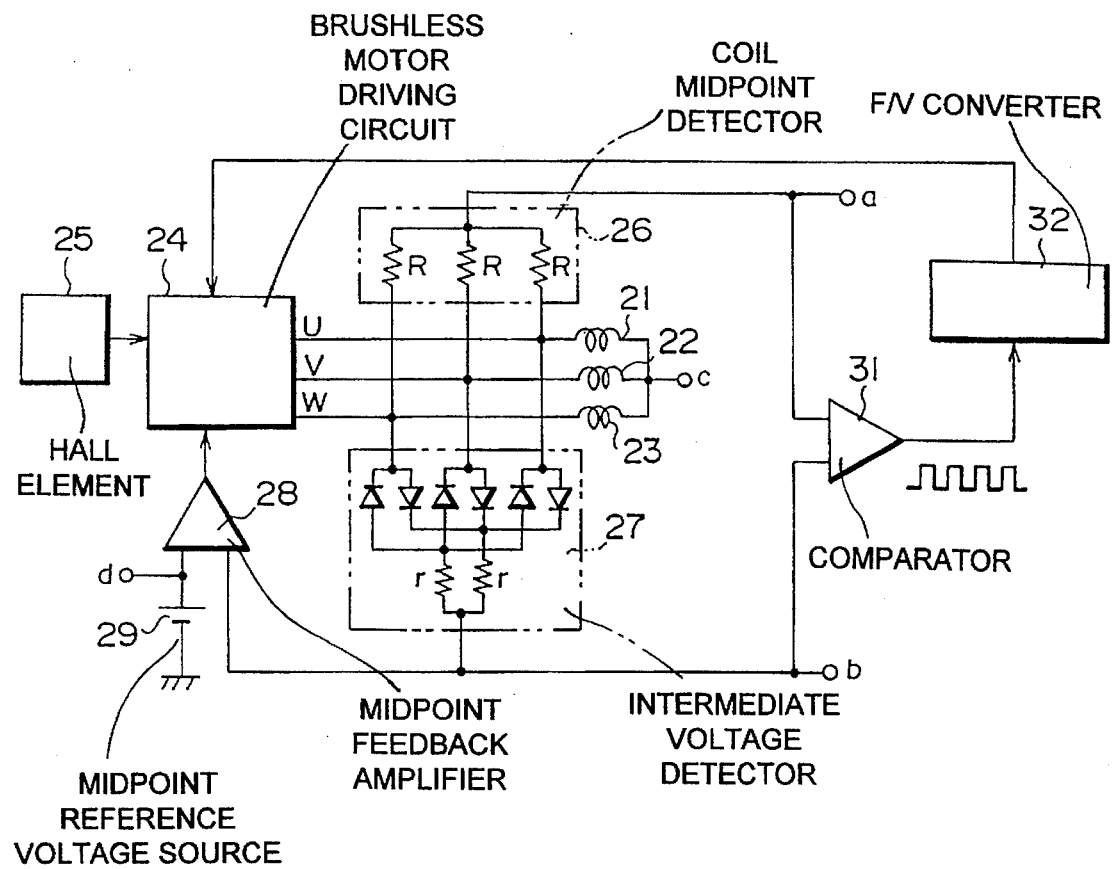
FIG. 1 is a circuit diagram of an embodiment of the brushless motor speed detector of the present invention.

In FIG. 1, a driving current is supplied from a brushless motor driving circuit 24 to the group of ends of driving coils 21, 22, and 23 comprising three phases of U, V, and W and the other group of ends of the driving coils 21, 22, and 23 are connected to each other to serve as a coil midpoint "c". The motor driving circuit (motor driver) 24 supplies 120°-switching current to the driving coils 21, 22, and 23 in accordance with a detection output of a Hall element 25 for detecting the rotational position of a rotor magnet (not illustrated).

The driving coils 21, 22, and 23 are connected to a coil midpoint detector 26 comprising three resistances R. The coil midpoint detector 26 falsely obtains a signal which is the same as the signal "c" of the coil midpoint, which is constituted by connecting one group of ends of the resistances R equal to the number of phases to the output terminals of the motor driving circuit 24 and connecting the group of the other ends of the resistances R to each other. The other ends of the resistances R connected to each other serve as output terminals of the coil midpoint detector 26. The driving coils 21, 22, and 23 are also connected to an intermediate voltage detector 27. The intermediate voltage detector 27 detects the intermediate voltage between the maximum and minimum values of the output voltage waveforms of the phase coils 21, 22, and 23 and comprises three diodes for passing forward output voltages of the phase coils 21, 22, and 23 respectively, a resistance "r" for simultaneously fetching the outputs from these diodes, three diodes for passing backward output voltages respectively, and a resistance "r" for simultaneously fetching the outputs from these diodes. The other ends of the two resistance "r" serve as output terminals of the intermediate voltage detector 27.

Figure 2:
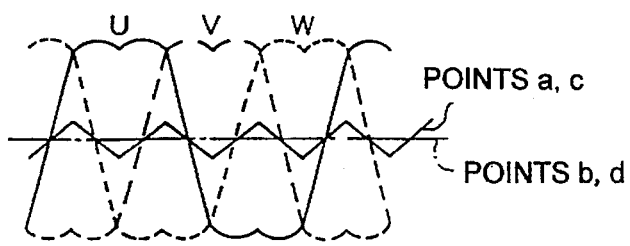
FIG. 2 is a waveform diagram showing signal waveforms of various portions of the above embodiment.

The output terminals of the intermediate voltage detector 27 are connected to one input terminal of a coil midpoint feedback amplifier 28 and a coil midpoint reference voltage "d" is supplied as an input to the other input terminal of the amplifier 28 from a coil midpoint reference voltage source 29. An output of the coil midpoint feedback amplifier 28 is supplied as an input to the motor driving circuit 24 to constitute a coil midpoint feedback circuit. The coil midpoint feedback circuit controls the output "b" of the output terminal of the intermediate voltage detector 27 so that the output coincides with the coil midpoint reference voltage "d" as shown in FIG. 2. Therefore, in this circuit, the intermediate voltage detector 27 constitutes constant signal output means. The output "a" of the coil midpoint detector 26 and the output "c" of the coil midpoint are supplied to the intermediate voltage detector 27 in the form of triangular-waveform signals alternately varied due to the rotation of a motor as shown in FIG. 2. Therefore, the coil midpoint detector 26 constitutes variable signal output means. Driving currents of U, V, and W phases serve as 120°-switching current. When no driving current of each phase is supplied, a counterelectromotive voltage is generated in the driving coil of each phase. Therefore, signals at the terminals of the phase driving coils 21, 22, and 23, that is, the signals at the phase output terminals of the motor driving circuit 24 serve as the signals shown in FIG. 2 and the output "a" of the coil midpoint detector 26 and the output "c" of the coil midpoint which are obtained by synthesizing the above signals serve as alternately-varying triangular-waveform signals like the above ones.

The signal "a" at the output terminal of the coil midpoint detector 26 is compared with the output "b" at the output terminal of the intermediate voltage detector 27 by one comparator 31 and a motor speed detection signal proportional to the rotation of a motor is provided as an output. As shown in FIG. 2, an output of the comparator 31 corresponds to three cycles for one cycle of the terminal signal of each phase driving coil, that is, two driving magnetized poles and speed detection signals for one turn of a motor more than the number of driving magnetized poles are provided as an output. The speed detection signal is converted into a voltage signal by a frequency-voltage converter 32, supplied as an input to a speed control circuit included in the motor driver 24, and used for speed control.

As described above, this embodiment is provided with the coil midpoint detector 26 serving as variable signal output means for providing a signal alternately varied due to the rotation of a motor, the intermediate voltage detector 27 serving as constant signal output means for providing a signal not varied due to the rotation of the motor, and one comparator 31 for providing speed detection signals for one turn of the motor more than the number of driving magnetized poles by comparing the detection signal of the coil midpoint detector 26 with an output signal of the intermediate voltage detector 27. Therefore, it is possible to obtain a speed detection signal without using an FG pattern or FG magnetization. Moreover, because use of only one comparator is enough, the structure is simple and low-cost and there is no fluctuation of circuits. Therefore, a high-accuracy speed detection signal can be obtained. Furthermore, because speed detection signals for one turn of a motor more greater than the number of driving magnetized poles are provided as outputs from one comparator 31, a high-resolution brushless motor speed detector can be obtained.

When the circuit constitution of the above embodiment is built in a brushless motor driver IC, the IC requires only one more pin for an output of one comparator. Therefore, it is possible to prevent the number of pins of an IC from increasing. However, when an FG is used, at least three pins are necessary as the pins of an FG amplifier. Therefore, in such arrangement there is a disadvantage that the number of pins of an IC increases.

As shown in FIG. 2, the output means "a" of the coil midpoint detector 26 is the same as the signal "c" of the coil midpoint and the output signal "b" of the intermediate voltage detector 27 is the same as the coil midpoint reference voltage "d". Therefore, it is possible to combine "a" with "d", "c" with "b", or "c" with "d" in addition to the combination of "a" with "d" as an input of one comparator 31.

Figure 3:
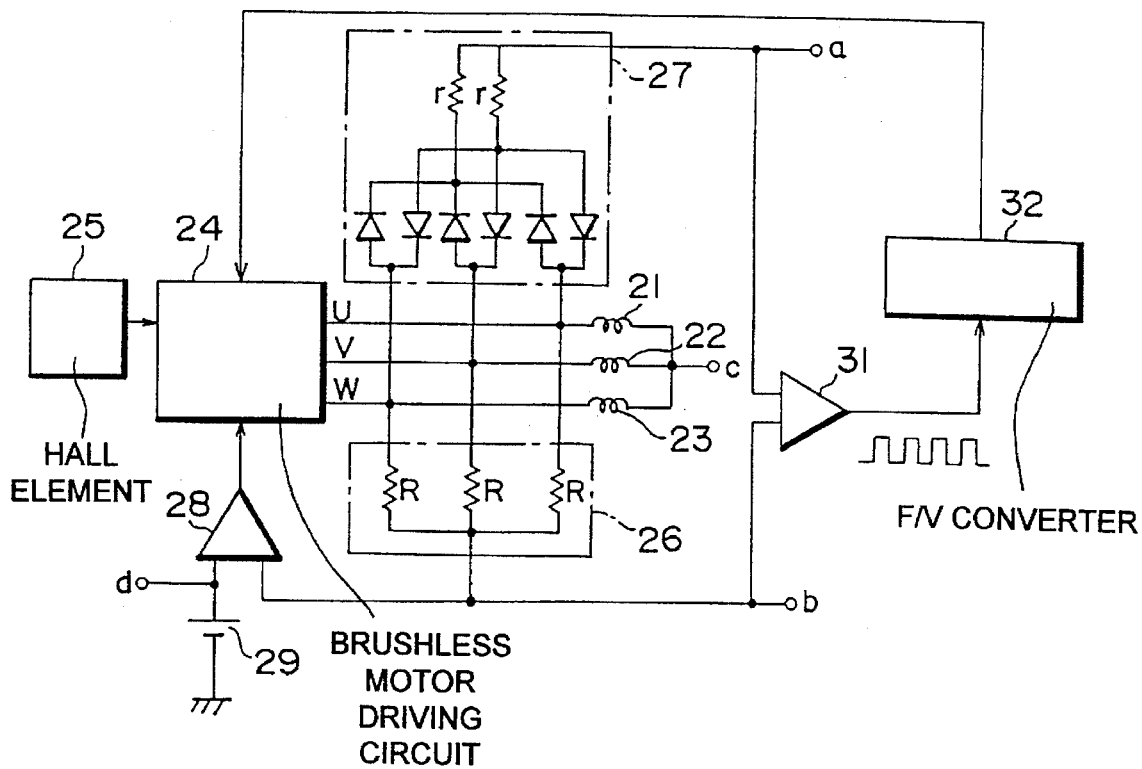
FIG. 3 is a circuit diagram of another embodiment of the brushless motor speed detector of the present invention.
Figure 4:
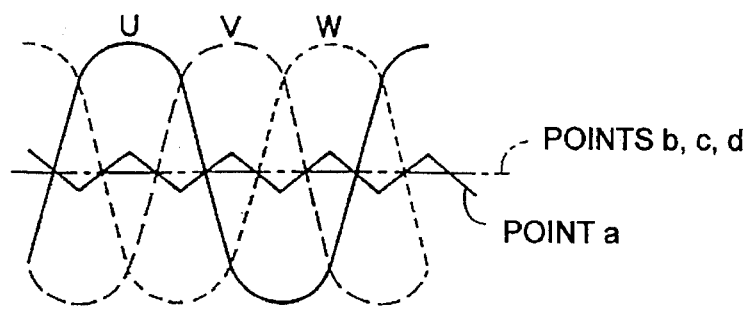
FIG. 4 is a waveform diagram showing signal waveforms of various portions of the above embodiment.

Another embodiment shown in FIGS. 3 and 4 is described below. This embodiment is different from the above-described embodiment in that a coil midpoint feedback circuit is formed by using the intermediate voltage detector 27 as variable signal output means, the coil midpoint detector 26 as constant signal output means, and an output of the coil midpoint detector 26. By supplying the output "b" of the coil midpoint detector 26 and the coil midpoint reference voltage "d" to the coil midpoint feedback amplifier 28 to constitute a coil midpoint feedback circuit, the output "b" of the coil midpoint detector 26 serves as a constant signal equal to the coil midpoint reference voltage "d" as shown in FIG. 4 and the signal "c" also serves as a constant signal equal to the coil midpoint reference voltage "d". However, the output signal "a" of the intermediate voltage detector 27 serves as a triangular-waveform signal alternately varied due to the rotation of a motor as shown in FIG. 4.

The output signal "a" of the intermediate voltage detector 27 is compared with the output signal "b" of the coil midpoint detector 26 by one comparator 31 and a motor speed detection signal is provided as an output. Also in the case of this embodiment, as shown in FIG. 4, an output of the comparator 31 corresponds to three cycles for one cycle of the terminal signal of each phase driving coil, that is, two driving magnetized poles and speed detection signals for one turn of a motor more than the number of driving magnetized poles are provided. Because other structures are the same as those of the previously-mentioned embodiment, the related description is omitted.

This embodiment also has the same functions and advantages as the previously-described embodiment because it is provided with the intermediate voltage detector 27 serving as variable signal output means for providing a signal alternately varied due to the rotation of a motor, the coil midpoint detector 26 serving as constant signal output means for providing a signal not varied due to the rotation of the motor, and one comparator 31 for comparing the detection signal of the intermediate voltage detector 27 with an output signal of the coil midpoint detector 26 to provide speed detection signals for one turn of the motor more than the number of driving magnetized poles.

As described above, because the output "b" of the coil midpoint detector 26, the coil midpoint reference voltage "d", and the coil midpoint signal "c" are equal to each other, it is possible to combine "a" with "c" or "a" with "d" in addition to the combination of "a" with "b" as an input of one comparator 31.

Figure 5:
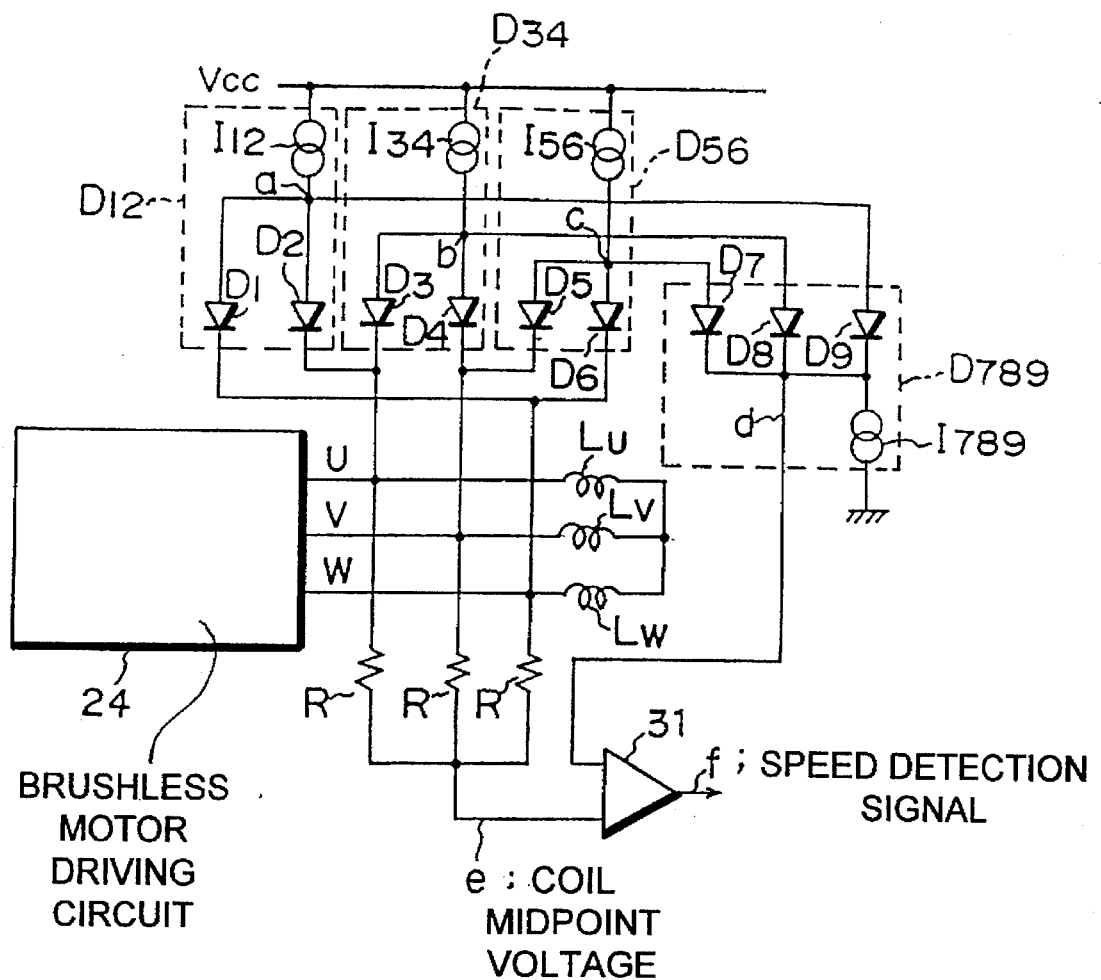
FIG. 5 is a block diagram of the brushless motor speed detector of still another embodiment of the present invention.

The brushless motor speed detector of the embodiment in FIG. 5 is constituted so that a speed detection signal corresponding to the alternate cycle of a variable signal can be obtained because alternate variable signals provided from the first and second variable signal output means due to the rotation of a motor are compared to each other by one comparator.

That is, cathodes common of diodes D2 and D3 are connected to the output terminal of the driving coil $L_U$, cathodes common of diodes D4 and D5 are connected to the output terminal of the driving $L_V$, and cathodes common of diodes D1 and D6 are connected to the output terminal of the driving coil $L_W$. A power supply Vcc is connected to anodes common of the diodes D1, D2, D3, D4, D5, and D6 respectively through current sources $I_{12}$, $I_{34}$, and $I_{56}$. The anodes of diodes D7, D8, and D9 are connected to the anodes common of a two-input diode OR circuit D12 comprising the diodes D1 and D2 and the current source $I_{12}$, a two-input diode OR circuit comprising the diodes D3 and D4 and the current source $I_{34}$, and a two-input diode OR circuit comprising the diodes D5 and D6 and the current source $I_{56}$ respectively. A ground power supply is connected to the cathodes common of these diodes D7, D8, and D9 through a current source $I_{789}$.

Resistances R, R, and R with the same resistance value are star-connected to the output terminals of the driving coils $L_U$, $L_V$, and $L_W$, one input terminal of the comparator 31 is connected to the star-connected resistances R, R common, and R, and the cathode common of a three-input diode OR circuit D789 comprising the diodes D7, D8, and D9 and the current source $I_{789}$ is connected to the other input terminal of the comparator 31.

Figure 6:
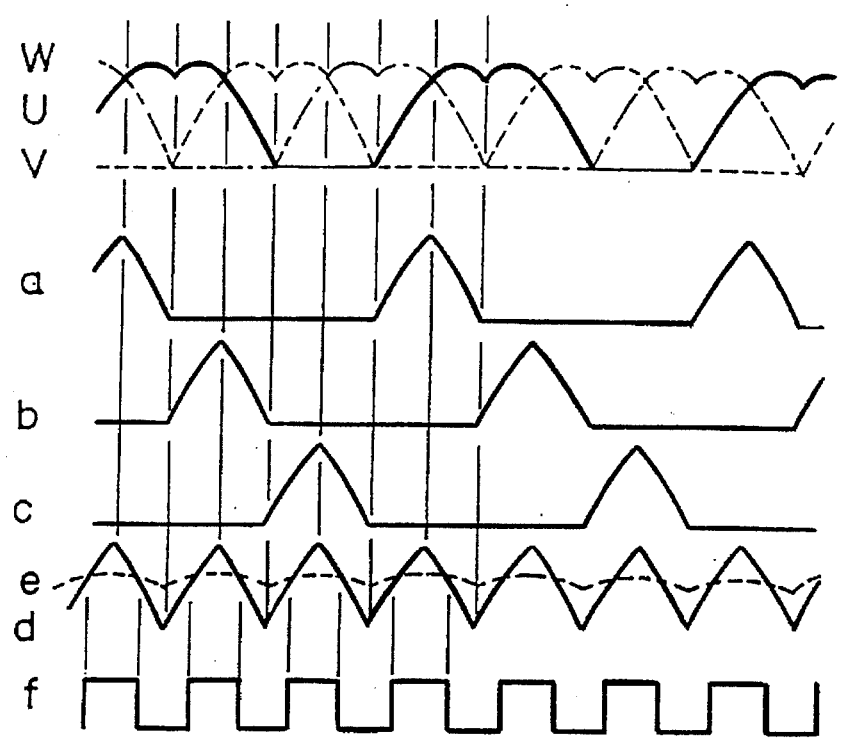
FIG. 6 is a timing chart for explaining the operation of the circuit in FIG. 5.

Then, operations of the speed detector thus constituted are described below. First, voltage signals shown by U (continuous line), V (dotted line), and W (alternate long and short dash line) in FIG. 6 are generated in the driving coils $L_U$, $L_V$, and $L_W$. These signals of U, V, and W phases are supplied to the two-input diode OR circuits D12, D34, and D56 respectively and only a waveform with the lowest potential in a set of two-input waveforms (U, W phase, U, V phase, V, W phase) is provided to the three-input diode OR circuit D789 from the two-input diode OR circuits D12, D34, and D56.

That is, the waveform shown by "a" in FIG. 6 is provided from the two-input diode OR circuit D12, the waveform shown by "b" in FIG. 6 is provided from the two-input diode OR circuit D34, and the waveform shown by "c" in FIG. 6 is outputted from the two-input diode OR circuit D56.

Three-phase signals provided from these two-input diode OR circuits D12, D34, and D56 are supplied to the three-input diode OR circuit D789 and only a waveform with the highest potential among the three-input waveforms as shown by "a", "b", and "c" in FIG. 6 is provided to one input terminal of the comparator 31 from the three-input diode OR circuit D789. That is, the triangular-wave signal shown by "d" in FIG. 6 is provided from the three-input diode OR circuit D789.

The triangular-wave signal provided from the three-input diode OR circuit D789, that is, the first variable signal output means and the signal provided from the coil midpoint voltage shown by "e" in FIG. 6 obtained from the star-connected resistances R, R, and R, that is, the second variable signal output means are supplied to and compared by the comparator 31, and the speed detection signal shown by "f" in FIG. 6 is provided as an output from the comparator 31.

Figure 9:
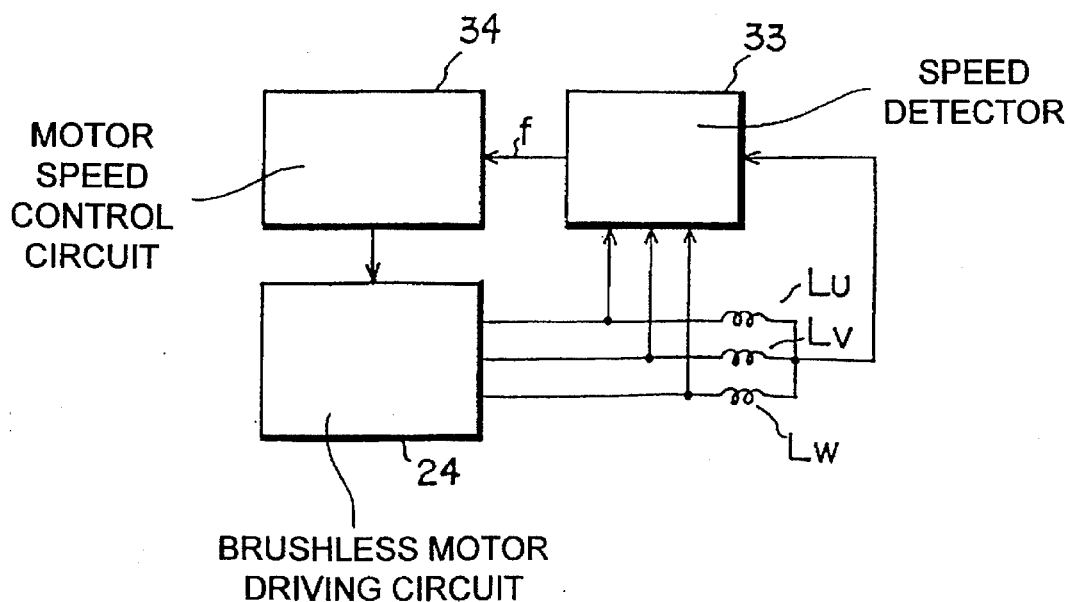
FIG. 9 is a block diagram of a brushless motor driving unit using the brushless motor speed detector of the present invention.
Figure 10:
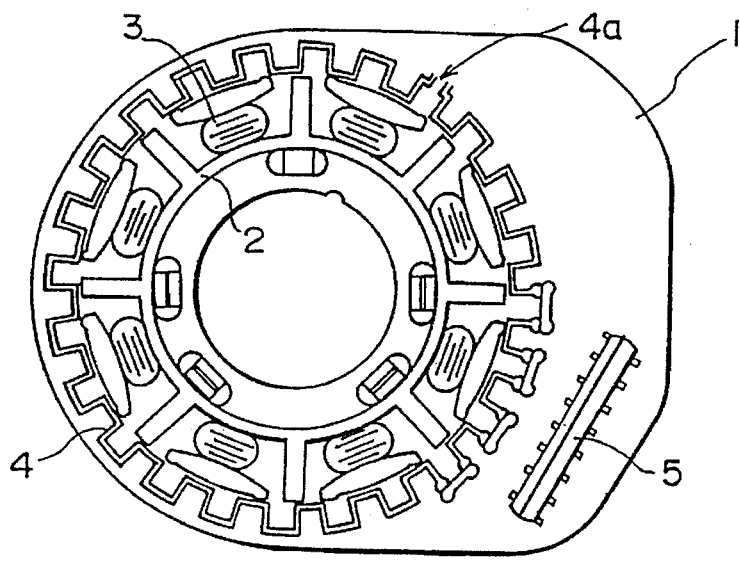
FIG. 10 is a top view of a stator of an existing motor with an FG.
Figure 11:
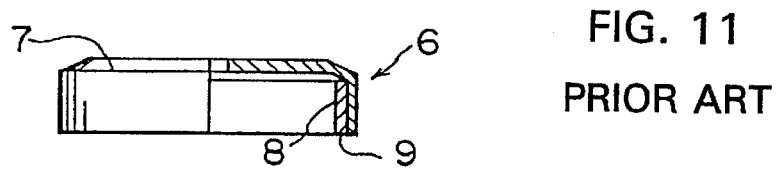
FIG. 11 is a top view of a rotor of the above motor with an FG.
Figure 12:
FIG. 12 is a partial sectional front view of a rotor used for the above motor with an FG.
Figure 13:
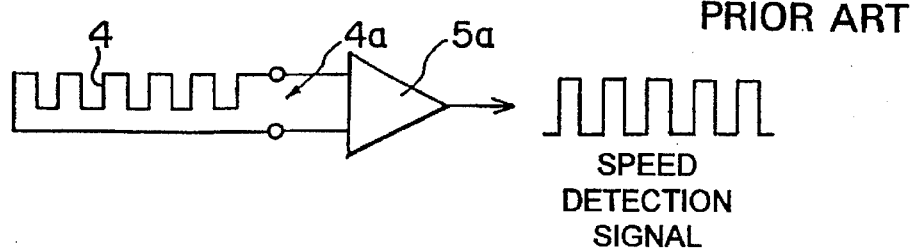
FIG. 13 is a circuit diagram of a speed detection circuit used for the above existing motor.
Figure 14:
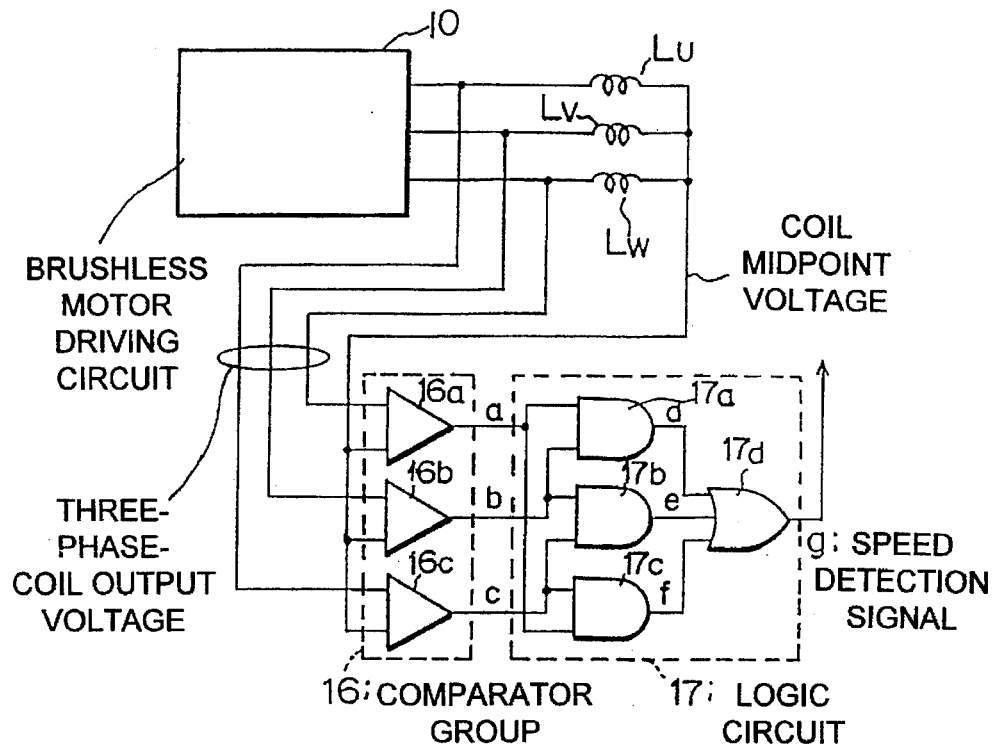
FIG. 14 is a block diagram of a speed detector of an existing motor with no FG.
Figure 15:
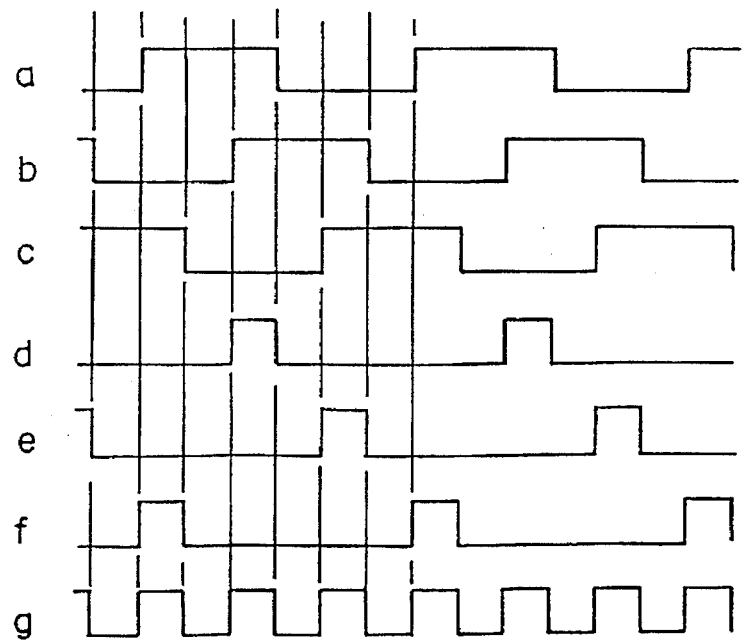
FIG. 15 is a timing chart for explaining the operation of the circuit in FIG. 14.

Then, as shown in FIG. 9, motor speed is kept constant by supplying the speed detection signal "f" from the speed detector 33 to the motor speed control circuit 34 and operating a control input of the brushless motor driving circuit 24.

As described above, the above embodiment is provided with the two-input diode OR circuits D12, D34, and D56 connected between the phases of the output terminals of the driving coils $L_U$, $L_V$, and $L_W$; the three-input diode OR circuit D789 connected to the output terminals of the two-input diode OR circuits D12, D34, and D56 and inversely connected to the diodes D1 to D6 of the two-input diode OR circuits D12, D34, and D56; the star-connected resistances R, R, and R for detecting the midpoint voltage of the three-phase driving coils; and the comparator 31 for comparing the coil midpoint voltage detected by the star-connected resistances R, R, and R with the output voltage of the three-input diode OR circuit D789 to output a speed detection signal: in which a waveform with the lower potential among the two-input waveform is provided from the two-input diode OR circuits D12, D34, and D56. Therefore, a waveform with the highest potential among three input waveforms is provided as an output in the three-input diode OR circuit D789 inversely connected to the diodes D1 to D6 of the two-input diode OR circuits D12, D34, and D56 and a triangular-wave signal is provided as an output from the three-input diode OR circuit D789. When the triangular-wave signal and the coil midpoint voltage are compared by the comparator 31, a speed detection signal is provided as an output from the comparator 31. Therefore, use of only one comparator is enough though three comparators have been used so far and the accuracy of a speed detection signal can be improved.

Moreover, because a logic circuit is unnecessary when use of only one comparator is enough, the circuit structure is greatly simplified.

Furthermore, the circuit of this embodiment can easily be formed as an IC and also it can be built in a motor driving IC.

Figure 7:
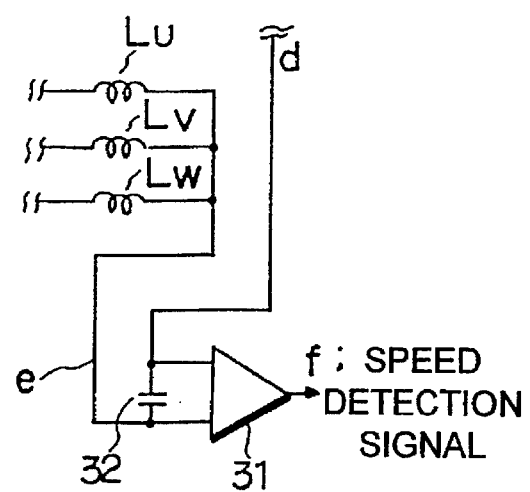
FIG. 7 is a block diagram of the main portion of the brushless motor speed detector of still another embodiment of the present invention.

FIG. 7 is a block diagram of the main portion of the brushless motor speed detector of still another embodiment.

This embodiment is different from that of the above embodiment in that coils common of the driving coils $L_U$, $L_V$, and $L_W$ are directly connected to the other input terminal of the comparator 31. The same advantage can be obtained from this arrangement as in the above embodiment.

Moreover, as shown in FIG. 7, it is possible to connect a capacitor 32 for absorbing noises between both input terminals of the comparator 31.

Figure 8:
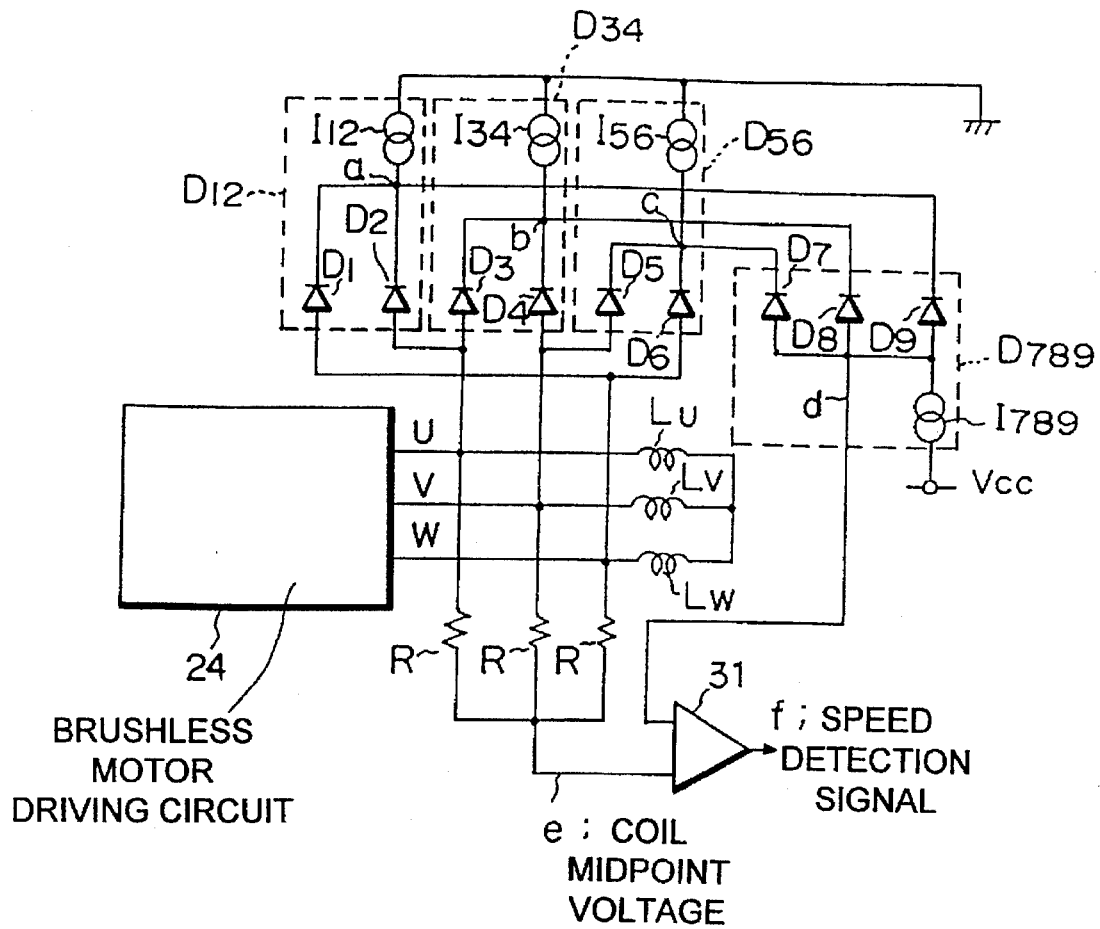
FIG. 8 is a block diagram of the brushless motor speed detector of still another embodiment of the present invention.

FIG. 8 is a block diagram showing the brushless motor speed detector of still another embodiment of the present invention.

The brushless motor speed detector of this embodiment is different from that of the above embodiment in that the diodes D1 to D6 constituting two-input diode OR circuits D12, D34, and D56 and the diodes D7 to D9 constituting the three-input diode OR circuit D789 are connected in the opposite direction to those of the above embodiment and the power supply Vcc is replaced with a ground power supply.

In the case of this arrangement, a waveform with higher potential of two input waveforms is provided as an output from the two-input diode OR circuits D12, D34, and D56 and a waveform with the lowest potential among three input waveforms is outputted from the three-input diode OR circuit D789. Because the output waveform of the three-input diode OR circuit D789 is the same as the triangular-wave signal shown by "d" in FIG. 6, the same advantage as the above described embodiment can be obtained.

It should be understood that the present invention is not restricted to the above embodiments and various modifications may be made within the spirit and scope of the invention. It is evident, for example, that the present invention can be applied to every type of brushless motor while remaining within its intended scope.

What is claimed is:

1. A brushless motor speed detector comprising:
   variable signal output means for generating and providing as an output a signal alternately varied due to rotation of a motor in accordance with a driving-coil output voltage waveform of each phase of the motor;
   constant signal output means for generating and providing as an output a signal not varied due to the rotation of said motor in accordance with a driving-coil output voltage waveform of each phase of the motor;
   control means for controlling said output signal of said constant signal output means so as to coincide with a coil midpoint reference voltage of the driving coil; and
   a comparator for comparing said output signal of the variable signal output means with said output signal of the constant signal output means to provide a quantity of speed detection signals for one turn of the motor which is greater than the number of driving magnetized poles.

2. The brushless motor speed detector according to claim 1, wherein a speed detection signal provided as an output from said comparator is supplied to a speed control circuit in order to control speed.

3. A brushless motor speed detector comprising:
   variable signal output means for generating and providing as an output a signal alternately varied due to rotation of a motor in accordance with a driving-coil output voltage waveform of each phase of the motor;
   constant signal output means for generating and providing as an output a signal not varied due to the rotation of the motor in accordance with the driving-coil output voltage waveform of each phase of the motor;
   control means for controlling an output signal of said constant signal output means so as to coincide with a coil midpoint reference voltage of the driving coil; and
   a comparator for comparing said output signal of the variable signal output means with said output signal of the constant signal output means to provide a quantity of speed detection signals for one turn of the motor which is greater than the number of driving magnetized poles;
   wherein said variable signal output means includes a coil midpoint detector formed by connecting a group of first ends of resistances equal to the number of phases to the output terminals of a driver and connecting a group of second ends of said resistances with each other or a coil midpoint;
   wherein said constant signal output means includes an intermediate voltage detector for detecting an intermediate voltage between maximum and minimum values of of each phase-coil output voltage waveform and the reference voltage of a midpoint feedback amplifier; and wherein a coil midpoint feedback circuit employing an output of the intermediate voltage detector is formed.

4. The brushless motor speed detector according to claim 3, wherein a speed detection signal provided as an output from said comparator is supplied to a speed control circuit in order to control speed.

5. A brushless motor speed detector comprising:

variable signal output means for generating and providing as an output a signal alternately varied due to rotation of a motor in accordance with a driving-coil output voltage waveform of each phase of the motor;

constant signal output means for generating and providing as an output a signal not varied due to the rotation of the motor in accordance with a driving-coil output voltage waveform of each phase of the motor;

control means for controlling said output signal of said constant signal output means so as to coincide with a coil midpoint reference voltage of the driving coil; and a comparator for comparing said output signal of the variable signal output means with said output signal of the constant signal output means to provide a quantity of speed detection signals for one turn of the motor which is greater than the number of driving magnetized poles;

wherein said constant signal output means includes a coil midpoint detector constituted by connecting a group of first ends of resistances equal to the number of phases to the output terminals of a driver and connecting a group of second ends of said resistances with each other, a coil midpoint, or a reference voltage of a coil midpoint feedback amplifier; and wherein a coil midpoint feedback circuit using an output of the coil midpoint detector is formed.

6. The brushless motor speed detector according to claim 5, wherein a speed detection signal provided as an output from said comparator is supplied to a speed control circuit in order to control speed.

7. A brushless motor speed detector comprising:

first and second variable signal output means for providing as an output a signal alternately varied due to the rotation of a motor; and a comparator for comparing an output signal of said first variable signal output means with an output signal of said second variable signal output means;

wherein said first variable signal output means includes a two input diode OR circuit connected between the phases of the output terminals of a driving coil respectively and a three input diode OR circuit connected to the output terminal of each two-input diode OR circuit and inversely connected to diodes of the two-input diode OR circuits and wherein the second variable signal output means includes coil midpoint detection means for detecting the midpoint voltage of the three-phase driving coil.

* * * * *